United States Patent
Heine et al.

(10) Patent No.: US 9,855,927 B2
(45) Date of Patent: Jan. 2, 2018

(54) ICE SCRAPER

(71) Applicant: Fiskars Garden Oy Ab, Billnäs (FI)

(72) Inventors: Mikko Heine, Billnäs (FI); Petteri Masalin, Helsinki (FI); Teemu Sandelin, Helsinki (FI); Mika Sokka, Tuusula (FI)

(73) Assignee: Fiskars Garden Oy Ab, Billnäs (FI)

( * ) Notice: Subject to any disclaimer, the term of this patent is extended or adjusted under 35 U.S.C. 154(b) by 0 days.

(21) Appl. No.: 14/885,810

(22) Filed: Oct. 16, 2015

(65) Prior Publication Data
US 2016/0121856 A1    May 5, 2016

(30) Foreign Application Priority Data
Oct. 30, 2014  (EP) .................................. 14190984

(51) Int. Cl.
*A47L 1/06* (2006.01)
*B60S 3/04* (2006.01)

(52) U.S. Cl.
CPC ................. *B60S 3/045* (2013.01); *A47L 1/06* (2013.01)

(58) Field of Classification Search
CPC ................... A47L 1/06; B60S 3/045
See application file for complete search history.

(56) References Cited

U.S. PATENT DOCUMENTS

| | | | | |
|---|---|---|---|---|
| 1,641,522 A | * | 9/1927 | Beckord | B44D 3/162 30/169 |
| 4,275,476 A | * | 6/1981 | Hopkins | B60S 3/045 15/236.02 |
| 4,418,439 A | * | 12/1983 | Porchet | B60S 3/045 15/236.02 |
| 4,813,458 A | * | 3/1989 | Jacobucci | B60S 3/045 15/236.02 |
| 5,471,698 A | | 12/1995 | Francis et al. | |
| 5,951,781 A | * | 9/1999 | Lucas | A47L 13/022 134/6 |
| 6,018,836 A | | 2/2000 | Williams | |
| 2006/0200932 A1 | | 9/2006 | Byrnes | |
| 2008/0282548 A1 | * | 11/2008 | Oikarinen | B25G 1/06 30/169 |

FOREIGN PATENT DOCUMENTS

| | | |
|---|---|---|
| RU | 2183422 C2 | 6/2002 |
| RU | 133028 U1 | 10/2013 |
| RU | 136403 U1 | 1/2014 |

OTHER PUBLICATIONS

European Search Report for Application No. 14190984.6, 5 pages (dated May 21, 2015).
English-language translation of Russian Office Action, App. No. 2015146257, Fiskars Garden Oy Ab, 3 pages (Jan. 16, 2017).

* cited by examiner

*Primary Examiner* — Randall Chin
(74) *Attorney, Agent, or Firm* — Foley & Lardner LLP

(57) ABSTRACT

An ice scraper for removing ice from a surface includes a longitudinal handle with a longitudinal axis, and a blade with a first scraping edge extending transversely relative to the handle. A blade holder extends between the handle and the blade, with the blade holder extending in an angle relative to the longitudinal axis of the handle. The blade is connected to the blade holder with a joint coupling for allowing movement of the blade relative to the blade holder.

9 Claims, 3 Drawing Sheets

ICE SCRAPER

CROSS-REFERENCE TO RELATED APPLICATIONS

This application claims the benefit of and priority to European Application No. 14190984.6, filed Oct. 30, 2014, all of which is incorporated by reference herein in its entirety.

FIELD OF THE INVENTION

The present invention relates to an ice scraper for removing ice from a surface, and more particularly to an ice scraper.

BACKGROUND OF THE INVENTION

Previously there are known many kinds of ice scrapers for removing ice from a surface and especially from car windows. A typical ice scraper comprises a handle for a user of an ice scraper to hold the ice scraper and for moving it back and forth on the window surface. A typical ice scraper also comprises a blade at the end of the handle for scraping the ice from the window surface; said blade comprises a scraping edge which contacts the ice on the window surface.

The ice scraper works by moving the scraper edge along on the window surface back and forth. The user of the ice scraper has to push the scraper forward and draw it backward many times during removal of ice from the surface and at the same time the scraping edge has to be pressed against the window surface to break the ice away from the surface.

One of the problems with typical ice scrapers is that because the car window is often at least slightly curved the user of the ice scraper has to push and draw the ice scraper along the window surface in different positions, i.e. hold the ice scraper handle in different angles relative to the window surface such that the scraping edge contacts the window surface all the time while moving back and forth and at the same time the scraper edge has to be pressed against the window in order to remove the ice efficiently. Many times the ice is efficiently removed only at a certain scraping angle and it is difficult to keep this contact angle constant on the curvature of the surface. This causes a lot of strain especially when the ice is firmly attached to the surface of the window.

BRIEF DESCRIPTION OF THE INVENTION

An object of the present invention is thus to provide an ice scraper for removing ice from a surface so as to alleviate the above disadvantages. The objects of the invention are achieved by an ice scraper which is characterized by what is stated in the independent claim. The preferred embodiments of the invention are disclosed in the dependent claims.

The invention is based on the idea of having a joint coupling between the blade holder of the ice scraper and the blade so that the scraping edge can follow the window surface at a constant angle even when it is curved. In other embodiments of the invention it is further based on the idea of having more than one scraping edge extending transversely relative to the blade holder of the ice scraper and parallel to each other such that ice can be removed more efficiently from the window surface.

The invention is directed to an ice scraper for removing ice from a surface, said ice scraper comprising a longitudinal handle comprising a longitudinal axis; and a blade comprising a first scraping edge extending transversely relative to the handle, the ice scraper further comprises a blade holder extending between the handle and the blade, said blade holder extending in an angle relative to the longitudinal axis of the handle, said blade is connected to the blade holder with a joint coupling for allowing movement of the blade relative to the blade holder.

An advantage of the ice scraper according to the invention is that the joint coupling between the blade and the blade holder allows movement of the blade such that ice is more efficiently and perfectly removed from a surface and especially from a window surface of a car which is usually curved. An advantage of the embodiment of the invention in which the blade comprises more than one, and preferably two, scraping edges extending parallel to each other is that ice can be removed from the surface during a reciprocating motion. An advantage of the joint coupling is that the blade edges always remain in an optimal angle relative to the surface to be scraped. Further an advantage of the ice scraper according to the invention is that due to the joint coupling the scraping edges of the blade stay at an optimum angle relative to the surface to be scraped which gives a further advantage that the angles of the scraping edges stay always the same sized even though the blade in time wears. This is especially the case when the blade comprises two scraping edges on different sides of the joint coupling and arranged such that when scraping the scraping edges are symmetrically relative to the joint coupling on the surface to be scraped.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
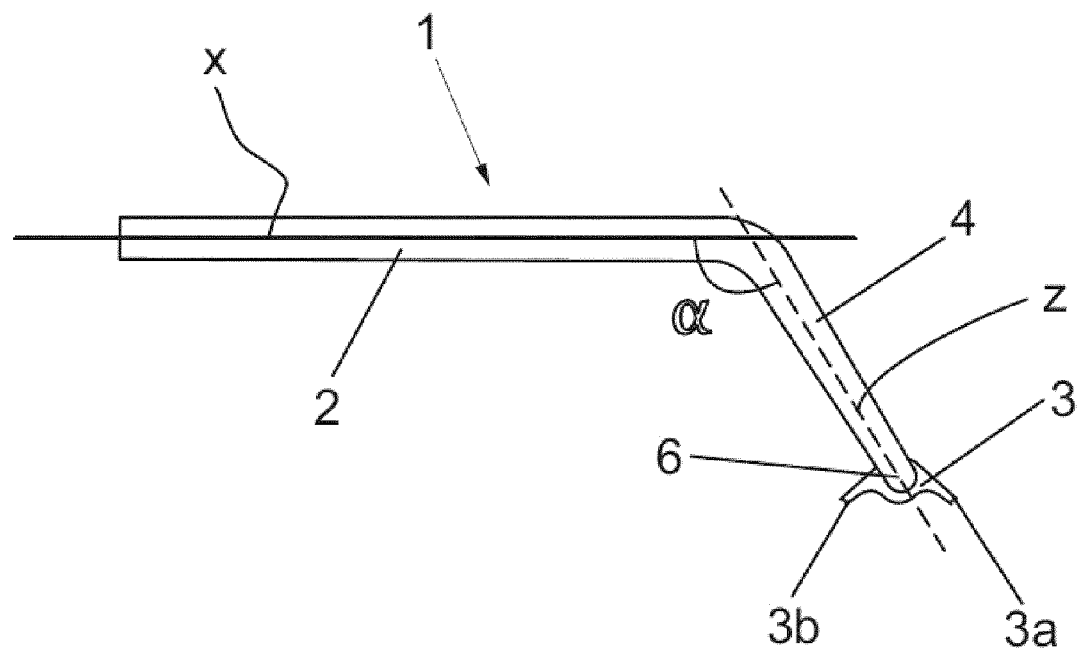
FIG. 1 shows an ice scraper according to the invention as a side view.

FIG. 1 shows an ice scraper 1 for removing ice from a surface. The ice scraper 1 comprises a longitudinal handle 2 comprising a longitudinal axis x and a blade 3 comprising a first scraping edge 3a extending transversely relative to the handle 2. The ice scraper 1 further comprises a blade holder 4 extending between the handle 2 and the blade 3 and extending in an angle α relative to the handle 2. The blade 3 is connected with a joint coupling to the blade holder 4 for allowing movement of the blade 3 relative to the blade holder 4. The angle α between the blade holder 4 and the handle 2 is preferably such that the movement of the blade 3 along the surface is essentially parallel to the movement of the handle 2. The angled arrangement between the handle 2 and blade holder 4 enables the user of the ice scraper 1 to hold the ice scraper 1 with a hand in a position where it does not hit the surface to be scraped and provides more ergonomic working position by keeping the handle 2 parallel to the surface to be scraped. The joint coupling is arranged between the blade holder 4 and the blade 3 and it is according to a preferred embodiment of the invention a hinge joint for turning the blade 3 relative to the blade holder 4.

The blade holder 4 has a longitudinal axis z and the blade 3 is connected to the blade holder 4 with a joint coupling which is preferably a hinge joint. The hinge joint comprises a pivot axis y (shown in FIG. 3) which is transverse to the longitudinal axis z of the blade holder 4. The blade 3 comprises a first scraping edge 3a extending parallel to the pivot axis of the hinge joint. In other words the first scraping edge 3a extends transverse to the longitudinal axis of the blade holder 4. The blade 3 further comprises a second scraping edge 3b extending transversely relative to longitudinal axis z of the blade holder 4 and parallel to and at a distance from the first scraping edge 3a. The first and second scraping edges 3a, 3b are preferably arranged such that in use when the ice scraper 1 is held such that the handle 2 is essentially parallel to the scraping surface, i.e. the surface wherefrom ice will be removed, the first and second scraping edges 3a, 3b will be on different sides of the joint coupling as seen from the scraping surface. In other words, the hinge joint comprises a pivot axis y parallel to the first and second scraping edge 3a, 3b of the blade 3 and transverse to the longitudinal axis z of the blade holder 4 and the scraping edges 3a, 3b are arranged on different sides of the longitudinal axis z of the blade holder 4.

FIG. 1 shows that the handle 2 and the blade holder 4 are arranged in an angle α relative to each other. The angle α between the handle 2 and the blade holder 4, or more particularly between the longitudinal axis x of the handle 2 and the longitudinal axis z of the blade holder 4 is less than 180° and more than 90°. According to a preferred embodiment of the invention the angle α between the longitudinal axis x of the handle 2 and the longitudinal axis z of the blade holder 4 is 90°-170°, and most preferably between 120-150°. So the handle 2 and the blade holder 4 are arranged in an angle α less than 180° relative to each other. In another embodiment of the invention the angle α between the longitudinal axis x of the handle 2 and the longitudinal axis z of the blade holder 4 is 180°.

The blade holder 4 is in a preferred embodiment of the invention a triangular part which becomes broader when extending from the handle 2 toward a distal edge 6 of the blade holder 4. The triangular form of the blade holder 4 is advantageous because it works as a snow pusher when scraping ice and snow and prevents snow from coming to the hand of the user. The blade holder 4 may have a curved form.

Figure 2:
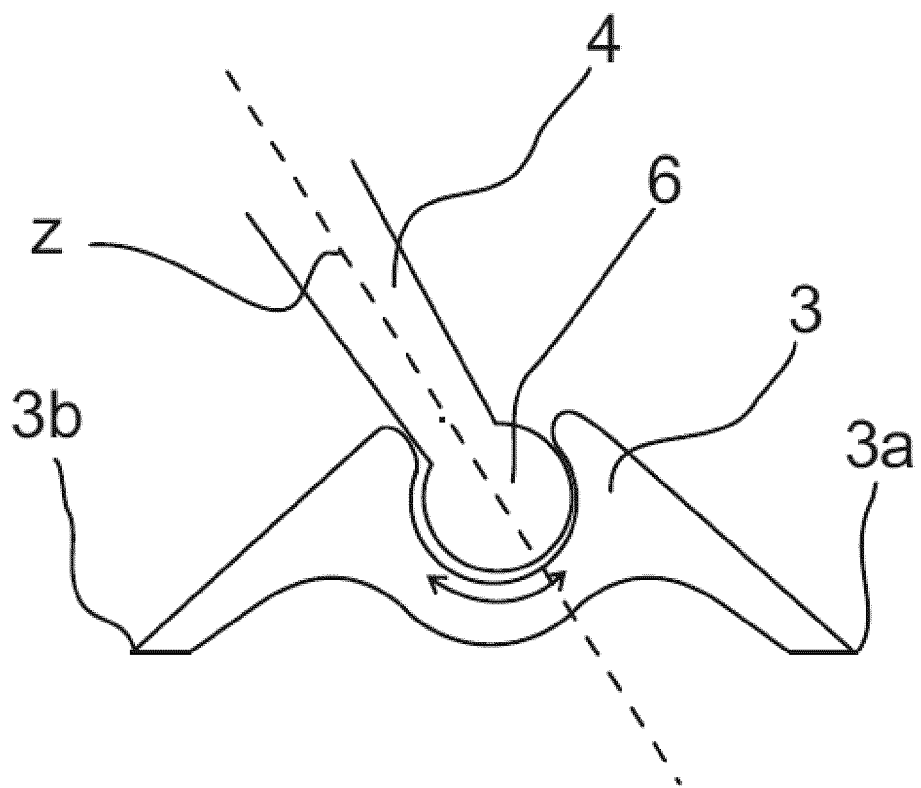
FIG. 2 shows a detail of the ice scraper according to the invention.

FIG. 2 shows a detail of the blade 3 and the connection between the blade 3 and the blade holder 4. The blade 3 comprises preferably two scraping edges 3a, 3b which are essentially parallel to the pivot axis y of the joint coupling. The first scraping edge 3a is a frontal scraping edge 3a. The form of the scraping edges 3a, 3b may be sharp and straight but other forms are possible as well. FIG. 1 shows one embodiment of the scraping edge 3a, 3b in which the edge is not straight but rather forms a groove and FIG. 2 shows another embodiment of the scraping edge 3a, 3b in which the edge is straight. The scraping edges 3a, 3b are arranged on different sides of the pivot axis of the joint coupling when seen from the surface to be scraped. In other words the blade holder 4 comprises a longitudinal axis z and the scraping edges 3a, 3b of the blade 3 are arranged on different sides of the longitudinal axis z of the blade holder 4. This two scraping edge configuration is particularly favourable when scraping the ice from the surface by moving the ice scraper back and forth on the surface. When snow or ice to be removed from the surface has formed a thick layer on the surface, the blade 3 can tilt in relation to the joint coupling such that only the frontal scraping edge 3a scrapes the surface first. Then, the second scraping edge 3b follows in the path of the frontal scraping edge 3a when pushing the ice scraper on the surface and the blade 3 scrapes the ice and/or removes snow. When the frontal scraping edge 3a only makes connection with the surface there is more pressure in the surface and the thick layer of ice will be removed more effectively.

FIG. 2 shows an embodiment of the invention in which the blade holder 4 comprises a tongue extending at least partly along a distal edge 6 of the blade holder 4 and the blade 3 comprises a groove for the tongue, said groove and tongue forming a form fitting connection. Although the figure shows that there is space between the distal edge 6 and the blade 3 it is only for the sake of clarity of the figure and there really is a form fitting connection between the blade 3 and the distal edge 6 of the blade holder 4 without any space. The tongue may extend all the way through the distal edge 6 of the blade holder 4 or it may only be arranged to extend partly, for example such that the tongue is arranged in the mid part of the distal edge 6. The tongue may also be arranged on both ends of the distal edge 6 at a distance from each other. This embodiment allows the midpoint of the blade 3 to bend inwards toward the blade holder 4 when scraping curved surfaces. The blade 3 may comprise at least one weakening near the joint coupling between the blade 3 and the blade holder 4 which also promotes bending. The blade holder 4 may also in addition or alone comprise a weakening in the distal edge 6. The weakening may be a cut, slot or similar form in the structure of the blade 3 and/or the blade holder 4.

Figure 3:
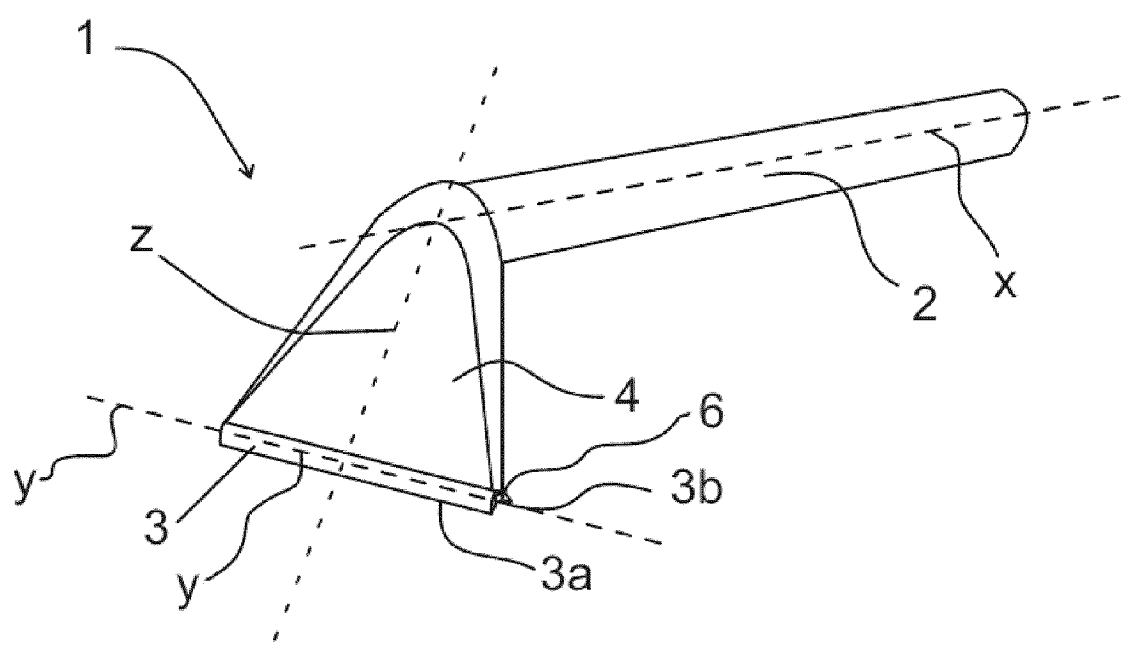
FIG. 3 shows an ice scraper according to the invention.

FIG. 3 shows an ice scraper 1 according to the invention in a three dimensional view. In a preferred embodiment of the invention the blade holder 4 of the ice scraper 1 is an integral part of the handle 2 and preferably made from nylon, PMMA or PC. The whole ice scraper can be made from the same material, i.e. from nylon, PMMA or PC. The blade holder 4 is preferably but not necessarily a plate-like element such that it narrows toward a proximal end of the blade holder 4, i.e. toward an intersection with the handle 2, and broadens toward a distal edge 6, i.e. toward the joint coupling with the blade 3. In the distal edge 6 of the blade holder 4 there is means for connecting the blade holder to the blade 3 or vice versa. In one embodiment of the invention the blade holder 4 comprises a tongue extending at least partly along the end of the blade holder 4 and the blade 3 comprises a groove for the tongue, said groove and tongue forming a form fitting connection. So a tongue is arranged on the distal edge 6 of the blade holder for forming a tongue-and-groove joint together with a groove arranged in the blade 3. The tongue need not to be extending the whole length of the distal edge 6 of the blade holder 4 but there may be multiple short tongues, for example such that there are only short tongues at the ends of the distal edge 6 of the blade holder 4 and between said tongues is an undercut which does not take part in the tongue-and-groove joint. In another embodiment of the invention the blade 3 comprises at least one tongue and the blade holder 4 comprises a groove for said tongue, said groove and tongue forming a form fitting connection. In this embodiment tongue may be arranged such that it does not extend the whole length of the blade in the direction of the pivot axis of the joint coupling. The groove may be formed in the distal edge 6 of the blade holder 4 such that it extends only partly the length of the distal edge 6 or it may be formed such that there are multiple grooves having plain area (i.e., area that does not comprise a groove) between adjacent grooves.

Although not shown in the figure the blade 3 may comprise at least one weakening near the pivot axis of the hinge joint between the blade 3 and the blade holder 4. The weakening may be a cut, a slot or similar arranged in the structure of the blade 3.

It will be obvious to a person skilled in the art that, as the technology advances, the inventive concept can be implemented in various ways. The invention and its embodiments are not limited to the examples described above but may vary within the scope of the claims.

The invention claimed is:

1. An ice scraper for removing ice from a surface, said ice scraper comprising:
    a longitudinal handle comprising a longitudinal axis (x);
    a blade comprising a first scraping edge extending transversely relative to the handle and a second scraping edge extending parallel to and which is kept at a distance from the first scraping edge; and
    a blade holder extending between the handle and the blade, said blade holder extending in an angle (α) relative to the longitudinal axis (x) of the handle, and said blade is connected to the blade holder with a joint coupling allowing movement of the blade relative to the blade holder;
    wherein the joint coupling between the blade holder and the blade comprises a hinge joint for turning the blade relative to the blade holder, the joint coupling connecting said blade to the blade holder at two locations arranged at a distance from each other whereby a midpoint of the blade between said locations bends inwards toward the blade holder when scraping a curved surface.

2. An ice scraper according to claim 1, wherein the handle and the blade holder are arranged in an angle (α) which is 180° or less than 180° relative to each other.

3. An ice scraper according to claim 2, wherein the angle (α) between the handle and the blade holder is within a range of substantially 90°-170°.

4. An ice scraper according to claim 1, wherein the blade holder is an integral part of the handle.

5. An ice scraper according to claim 1, wherein the hinge joint of the joint coupling includes, at the two locations, the blade holder comprising a tongue extending at least partly along a distal edge of the blade holder and the blade comprises a groove for the tongue, said groove and tongue forming a form fitting connection.

6. An ice scraper according to claim 5, wherein the tongue is arranged on both ends of the distal edge at a distance from each other.

7. An ice scraper according to claim 1, wherein the blade holder comprises a longitudinal axis (z) and the scraping edges of the blade are arranged on different sides of the longitudinal axis (z) of the blade holder.

8. An ice scraper according to claim 1, wherein the blade holder comprises a weakening in a distal edge.

9. An ice scraper according to claim 1, wherein the ice scraper is made from nylon, PMMA or PC.

* * * * *